(12) United States Patent
Thomas et al.

(10) Patent No.: US 7,865,710 B2
(45) Date of Patent: Jan. 4, 2011

(54) SOFTWARE RECOVERY WITHOUT THE USE OF A KEYBOARD, MOUSE, TRACKBALL OR COMPUTER MONITOR

(75) Inventors: Fred C. Thomas, Fort Collins, CO (US); Paul Boerger, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 795 days.

(21) Appl. No.: 11/741,985

(22) Filed: Apr. 30, 2007

(65) Prior Publication Data

US 2008/0270777 A1    Oct. 30, 2008

(51) Int. Cl.
- G06F 11/00 (2006.01)
- G06F 15/16 (2006.01)
- G06F 15/177 (2006.01)

(52) U.S. Cl. .................... 713/2; 713/1; 714/27; 714/30
(58) Field of Classification Search .................... 713/1, 713/2; 714/27, 30
See application file for complete search history.

(56) References Cited

U.S. PATENT DOCUMENTS

| | | | |
|---|---|---|---|
| 3,935,700 A * | 2/1976 | Van Haaften | 368/29 |
| 6,522,893 B1* | 2/2003 | Han et al. | 455/550.1 |
| 2003/0028800 A1 | 2/2003 | Dayan et al. | |
| 2003/0163753 A1 | 8/2003 | Lu et al. | |
| 2005/0262398 A1 | 11/2005 | Pan | |
| 2006/0015711 A1* | 1/2006 | Bang | 713/2 |
| 2006/0020844 A1 | 1/2006 | Gibbons et al. | |
| 2006/0020845 A1 | 1/2006 | Broyles, III et al. | |
| 2006/0150037 A1 | 7/2006 | Wang | |
| 2007/0043973 A1 | 2/2007 | Schneider | |
| 2008/0168310 A1* | 7/2008 | Saretto et al. | 714/30 |

* cited by examiner

*Primary Examiner*—Abdelmoniem Elamin

(57) ABSTRACT

A NAS device comprises a user control and storage in which at least one of an operating system and system firmware is stored. Logic is also provided that is coupled to the user control and the storage. The logic causes a recovery to be performed of the operating system or system firmware upon user activation of the user control. The NAS device does not comprise any of a keyboard, mouse, trackball, and computer monitor.

20 Claims, 5 Drawing Sheets

SOFTWARE RECOVERY WITHOUT THE USE OF A KEYBOARD, MOUSE, TRACKBALL OR COMPUTER MONITOR

BACKGROUND

Some electrical systems are "headless" meaning that a user input device such as a keyboard, mouse, trackball, etc. is not used with the system. In fact, some headless devices do not have electrical connection points (e.g., ports) to which such typical types of user input devices could be connected. One example of a headless system is network attached storage (NAS) device such as may be used in a home-based computing environment.

Some headless systems, however, comprise operating systems and system firmware that may become inoperative. Without the aforementioned typical user input devices, recovery from such failures is problematic.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a combination of two or more components. A system may comprise, for example, the combination of a server and a client communicatively coupled thereto, or a server alone, a client alone, or a subsystem within a computer.

DETAILED DESCRIPTION

Figure 1:
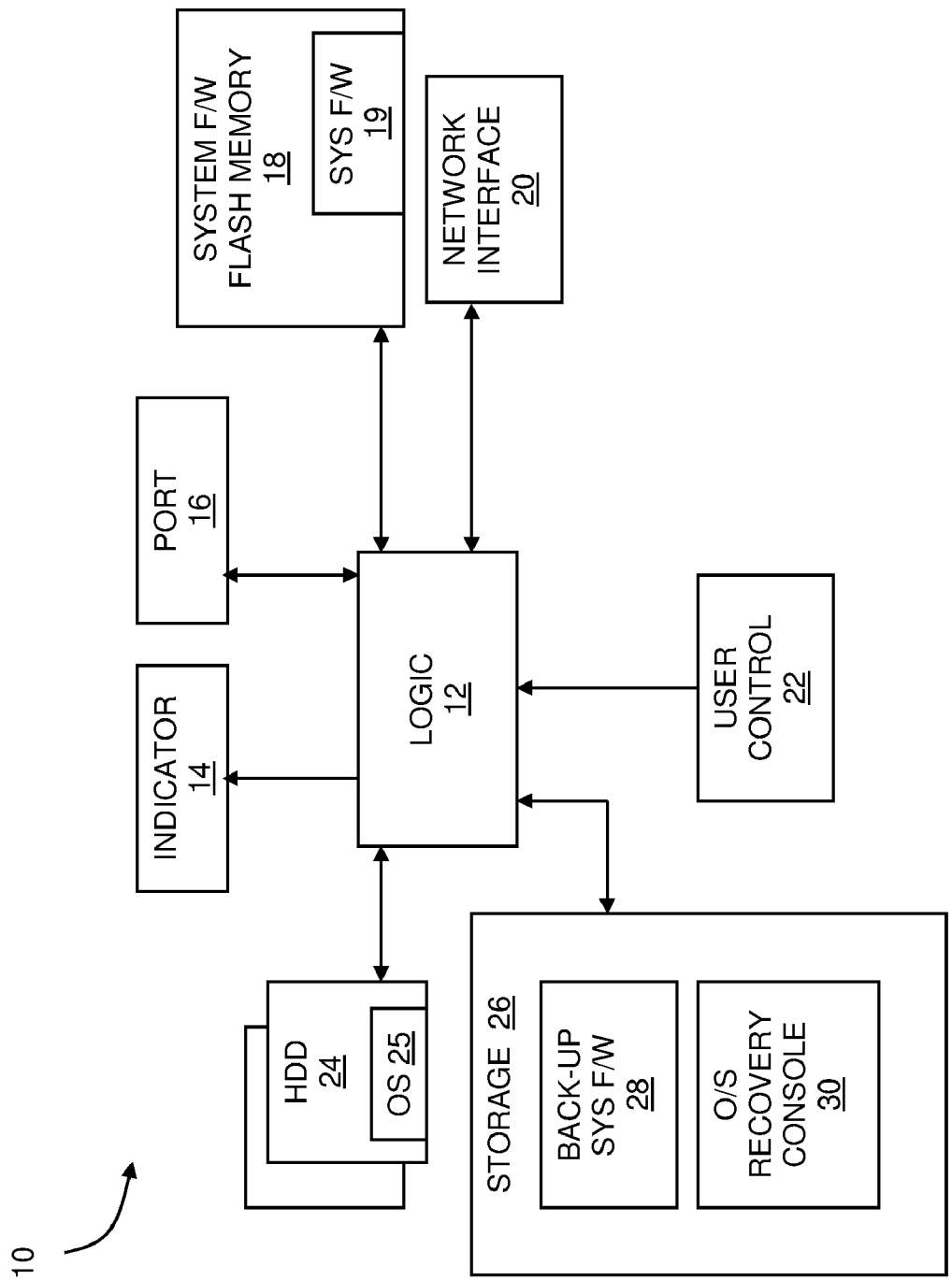
FIG. 1 shows a system in accordance with various embodiments.

FIG. 1 illustrates a system 10 in accordance with various embodiments. The system 10 of FIG. 1 comprises logic 12 coupled to an indicator 14, a port 16, storage 18 (e.g., Flash memory) in which system firmware 19 is stored, a network interface 20, a user control 22, storage 26 and one or more non-volatile storage devices 24 (e.g., hard disk drives (HDDs)). The logic 12 comprises, in some embodiments, a processor. In at least some embodiments, the system 10 is a "headless" system meaning, in some embodiments, that the system has no connections for connecting a computer input device (e.g., keyboard, mouse, trackball, etc.) or a computer monitor. In other embodiments, headless means that, while ports are provided for such standard input and output devices, no such input and output devices are coupled to or used with the system.

In some embodiments, the system 10 comprises a network attached storage (NAS) device. The HDDs 24 are used to store data for a user. The NAS device has network connectivity and thus comprises its own network address (as opposed to being attached to a computer and thus accessible only via the attached computer). The NAS device's files and administrative controls are accessible via other network devices for the purposes of file sharing and administration.

The system firmware 19 comprises code that is executable by the logic 12 (e.g., a processor). The system firmware 19 performs various functions. At least one function is to conduct a power on/self-test (POST) of the system 10 during initialization. For example, the system firmware tests memory, identifies the hardware installed in the system, etc. The system firmware also provides a software interface to various devices within the system following system initialization. In various embodiments, system firmware is also referred to as a basic input/output system (BIOS), boot monitor, and boot loader.

The storage 18 in which the system firmware is stored is re-writeable. Accordingly, updated versions of the system firmware can be written to the storage 18 to overwrite the existing version of system firmware provided in storage 18. For example, if the system firmware becomes corrupted, the logic 12 can overwrite the corrupted system firmware with a new version of system firmware (a process referred to as "recovering" the system firmware).

In at least some embodiments, the storage 26 comprises non-volatile storage such as Flash memory, read only memory (ROM), etc. The storage 26 stores a back-up copy 28 of system firmware along with an OS recovery console 30. The back-up copy 28 of the system firmware is normally not used and, instead, the system 10 operates using the system firmware 19 in storage 18. The system 10, however, can perform a system firmware recovery process in which the back-up copy 28 of system firmware is used instead of the system firmware in the storage 18.

In one embodiment, the system firmware recovery process comprises the logic 12 overwriting the system firmware in flash memory 18 with the back-up copy from the storage 26 and then using the newly overwritten system firmware 19 in storage 18 to perform the functionality consistent with the system firmware. In another embodiment, the system firmware recovery process comprises the logic 12 redirecting its use of system firmware from the firmware 19 in storage 18 to the firmware 28 in storage 26. In this latter embodiment, the system firmware in storage 18 is not overwritten and the logic 12 accesses and, instead, executes the alternative copy 28.

Referring still to FIG. 1, the indicator 14 comprises a status indicator. In various embodiments, the indicator 14 does not comprise a computer monitor. For example, indicator 14 does not comprise a video graphics adapter (VGA) monitor or any other type of display usable by a user of a computer to interact with executing applications (e.g., email, word processing, etc.). In some embodiments, the indicator 14 comprises a light emitting diode (LED). The indicator may be operable by the logic 12 to illuminate different colors (e.g., blue and red) and/or different blinking patterns. Examples of blinking patterns comprise an alternating pattern of different colors, an on/off pattern, etc.

The user control 22 comprises a user-actuatable input device to perform system firmware recovery, operating system recovery and to cause status information to be indicated via the indicator 14. In at least some embodiments, the user control 22 does not comprise a "QWERTY" keyboard, a mouse, a trackball, or other type of user input device by which a user would operate a computer to interact with an application executing on the computer (e.g., email, word processing, etc.). In some embodiments, the user control 22 comprises a button switch. Further still, the user control may comprise a button that resides within a recess in outer surface of a housing containing the electronics comprising the system 10. In some embodiments, the recess within which the button resides is substantially smaller than the diameter of the tip of a human finger. Consequently, as a recessed button, the user control 22 is incapable of being pressed by a user without a button assistance device. An example of a button assistance device comprises a straightened out paperclip. In such embodiments, the user control 22 cannot be accidentally pressed by a user.

The HDDs 24 of the system 10 store a primary operating system (OS) 25. The primary operating system 25 comprises a software interface on which various applications execute. In some embodiments, the primary operating system 25 comprises a WINDOWS® operating system from Microsoft Corp.

The port 16 shown in FIG. 1 comprises a connection point for a removable storage device to be communicatively coupled to the system 10. In some embodiments, the port 16 comprises a universal serial bus (USB) port to which a USB-compliant storage device can be mated.

The network interface 20 comprises, for example, an Ethernet interface by which the system 10 can communicatively couple to a local area network (LAN) or a wide area network (WAN). Through the network interface 20, system 10 can communicate with devices (e.g., computers, storage devices, etc.) over a network.

Figure 2:
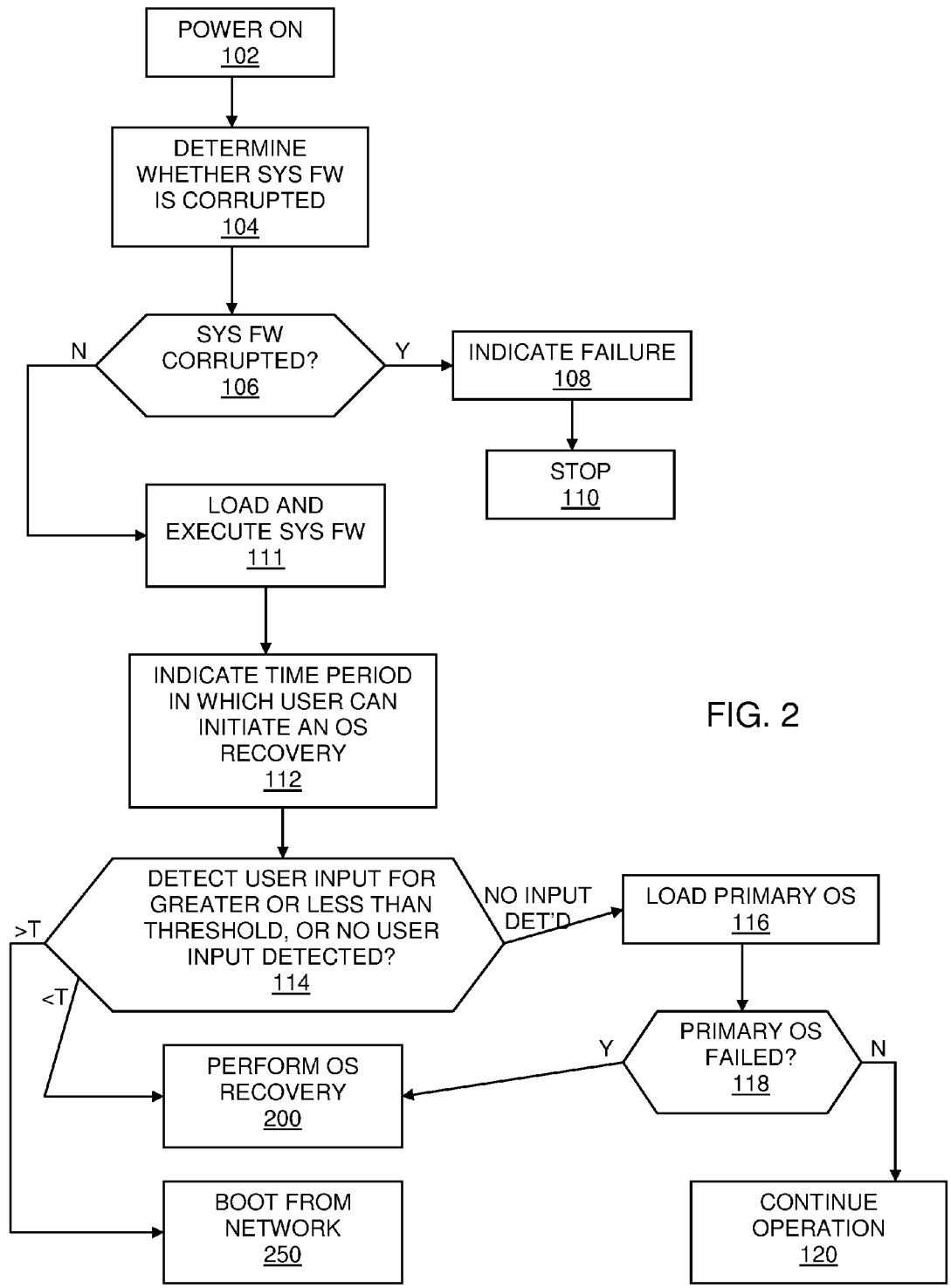
FIG. 2 shows a method operable on the system of FIG. 1.
Figure 3:
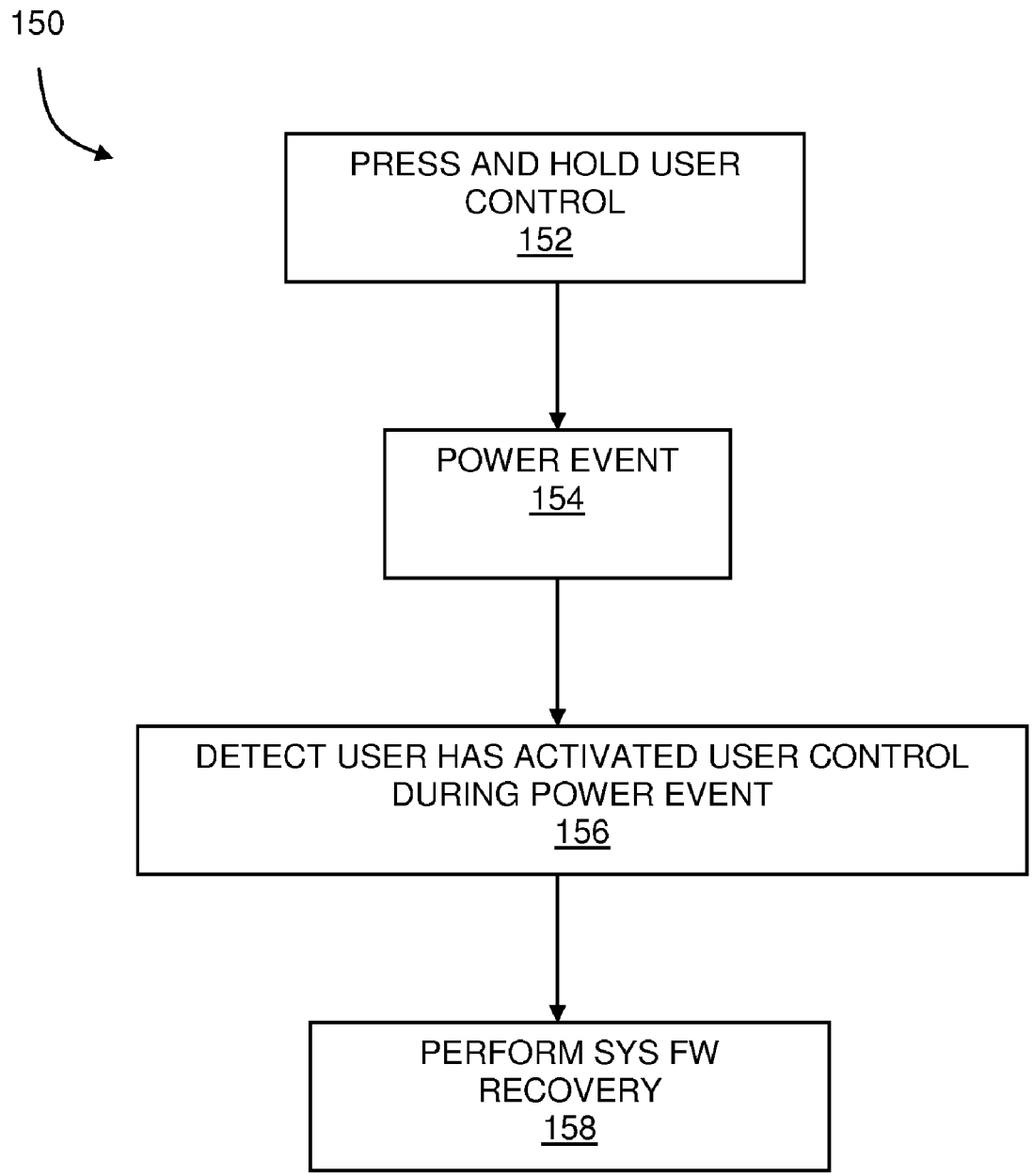
FIG. 3 illustrates a method for initiating system firmware recovery.

FIG. 2 illustrates a method 100 operable on the system 10 in accordance with various embodiments. The method 100 represents the operation of the system 10 during initialization. At 102, method 100 comprises powering on the system 10. Powering on the system 10 can be accomplished, for example, by activating a power button. At 104, the logic 12, by executing code for this purpose, determines whether the system firmware 1 is corrupted. In one embodiment, this action is performed by the logic 12 computing a checksum of some or all of storage 18 and comparing that computed checksum to a known valid value of that checksum. If the checksums match, the logic 12 determines that the system firmware 19 is corrupted. If the checksums do not match, the logic 12 determines that the system firmware is not corrupted. At decision 106, the logic 106 determines whether the system firmware is corrupted. If the system firmware is corrupted, the logic 12 illuminates the indicator 14 at 108 to indicate an error, and at 110, the system 10 ceases the initialization process. In one embodiment, the logic 12 causes the indicator 14 to illuminate red. This indication indicates to the user that the system firmware 19 was determined to be corrupted. FIG. 3 provides an illustrative method for recovering the system firmware and will be described below.

Referring still to FIG. 2, if the system firmware is not corrupted as determined at 106, then at 111, the valid system firmware from storage 18 is loaded and executed by the logic 12. At 112, method 100 further comprises indicating to the user a time period in which the user can manually initiate an operating system recovery. In some embodiments, the logic 12 indicates this time period by causing the indicator 14 to blink, perhaps with alternating colors (blue then red) for a predetermined period of time. The predetermined period of time may be, for example, ten seconds. The ten-second long blinking indicator 14 indicates to the user a time during which the user can force the system 10 to perform one or more operating system-related functions.

During this brief (e.g., ten second) time period, the user has three choices: (a) to let the time period expire without activating the user control 22 at all, (b) to activate the user control for a time less than a threshold, and (c) to activate the user control for a time greater than a threshold. The threshold may be eight seconds in some embodiments. At 114, the logic 12 detects whether the user activated the user control 22 for greater than or less than the threshold, or whether the user activated the user control 22 at all. If the user did not activate the user control 22 during the ten-second time period specified by the indicator 14, control passes to 116 at which the primary operating system 25 is loaded and executed. At 118, if the primary operating system loaded without failure, then system initialization ends and normal system operation continues at 120. The indicator 14, at this point, may be illuminated to indicate a successful system initialization (i.e., both system firmware 19 and the primary operating system 25 successfully loaded). In some embodiments, the indicator may be illuminated a constant (i.e., no blinking) green to indicate successful system initialization.

Figure 4:
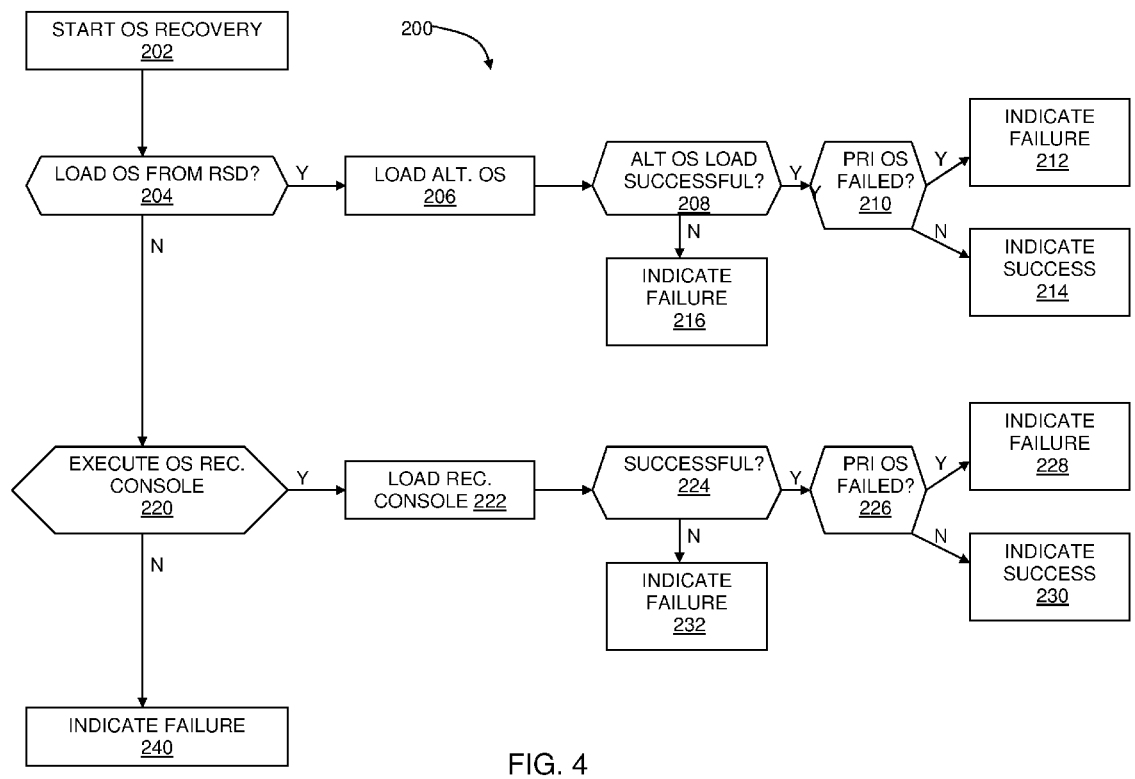
FIG. 4 illustrates a method for initiating operating system recovery.
Figure 5:
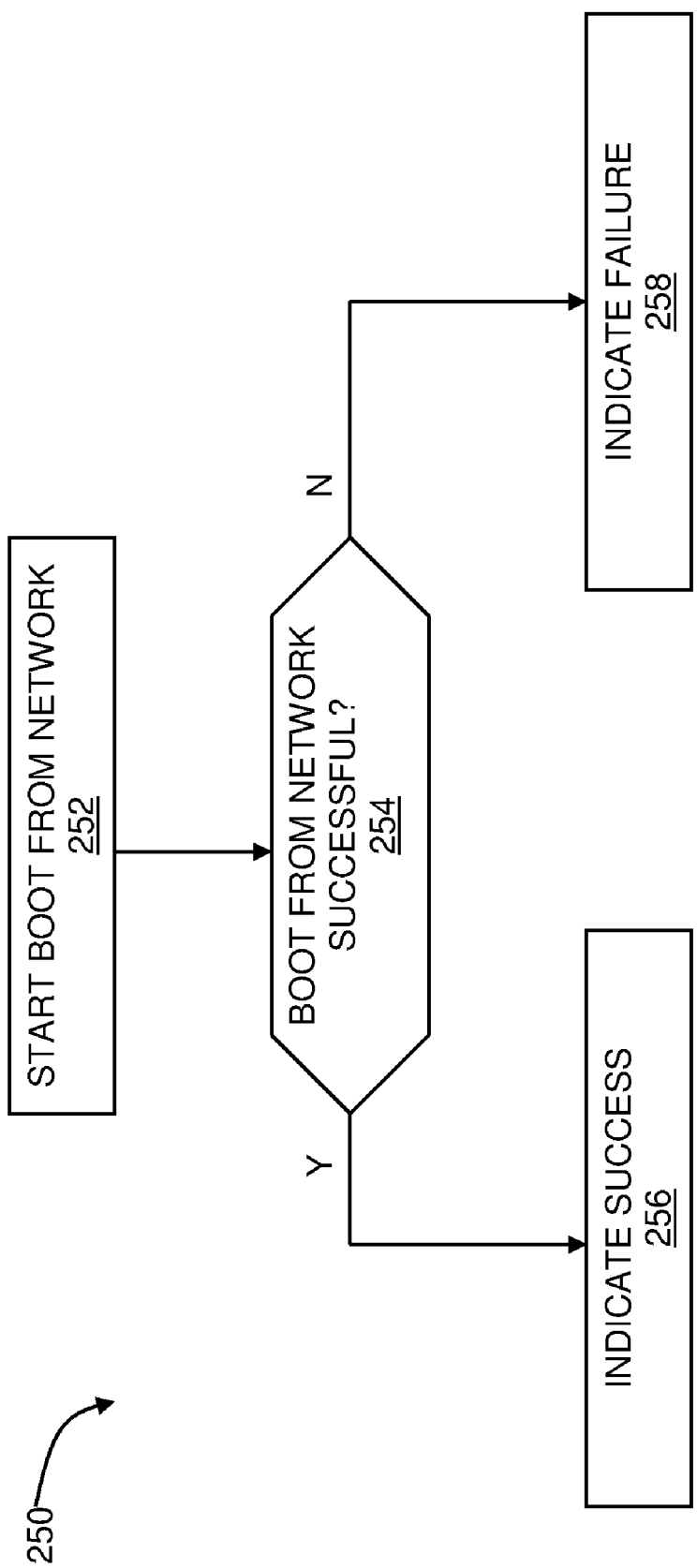
FIG. 5 illustrates a method for initiating a boot from a network.

Referring back to decision 114, if the user activates the user control 22 for less than the threshold period of time (e.g., eight seconds), then an operating system recovery is performed at 200 (an example of which is depicted in FIG. 4). If the user activates the user control 22 for greater than the threshold period of time, then the system is caused to boot from a network (an example of which is depicted in FIG. 5).

As noted above, the indicator 14 may be illuminated at 108 to indicate to the user that the system firmware 19 was determined to be corrupted. FIG. 3 illustrates a method 150 by which the user can cause the system to perform a system firmware recovery process. A complication is that the system 10 is headless and thus a computer keyboard, mouse, trackball, and monitor are not provided to facilitate the user executing a system firmware recovery process. In accordance with various embodiments, the user causes the system 10 to initiate the system firmware recovery process by pressing and holding down the user control 22 (152) while causing a power event to occur (154). The power event may comprise activating a power switch to turn power on to the system's electronics. At 156, the method further comprises detecting that a power event has occurred while the user has activated the user control. Detecting this combination of actions (i.e., concurrent power event and user control activation) causes the logic 12 to force a system firmware recovery process to occur. As explained above, the system firmware recovery process comprises, in one embodiment, overwriting the system firmware 19 in storage 18 with the copy 28 of the system firmware from storage 26. In another embodiment, the system firmware recovery process comprises redirecting the logic 12 to load and execute the system firmware copy 28 from storage 26 rather than the system firmware 19 from storage 18 in the Flash memory 18, and thus not re-flashing storage 18 with the system firmware copy 28.

FIG. 4 provides an illustrative embodiment of the method 200 in which an OS recovery is initiated and performed. The start of the OS recovery method 200 is illustrated at 202. As described above regarding FIG. 3, the OS recovery 200 is initiated in one of two ways in various embodiments. The user can force an operating system recovery to be performed by activating the user control 22 for less than the threshold time period while the indicator 14 blinks (112) during system initialization. Alternatively, if a failure of the load of the primary operating system occurs, the OS recovery method 200 is performed. Accordingly, at 202 in FIG. 2, loading of the primary operating system may or may not have failed.

The operating system can be recovered in multiple ways. For instance a removable storage device (e.g., USB device) comprising an operating system can be coupled to port 16. Method 200 determines whether such a removable storage device is present and contains a bootable operating system. If a storage device is present at port 16 and does contain a bootable operating system, then the logic 12 attempts to load this alternative operating system at 206. The load of the alternative operating system may or may not be successful as determined at 208. If the load of the alternative operating system is successful, then if the load of the primary operating system 25 had failed (as determined at 210), the indicator 14 is caused to indicate a failure at 212. Upon seeing the indication of a failure via indicator 14, using a button assistance device (e.g., paperclip), a user can activate the user control 22. As a result, the logic 12 causes the indicator 14 to indicate the nature of the error. In this case, the error is that the primary operating system failed to load. This particular error code can be indicated in any suitable manner such as by the color of the indicator 14 or a particular blinking pattern of the indicator.

If, at 210, logic 12 determines that the primary operating system had not failed (indicative of the user desiring to have the system 10 load the alternative operating system for a reason other than as a result of a failure of the primary operating system), then an indication of a successful operating system load is provided to the user at 214 by, for example, illuminating indicator 14. The user can activate the user control 22 using the button assistance device to have the logic 12 visually indicate (214) that the alternative operating system, not the primary operating system, successfully loaded and that no failure of the primary operating system was detected. This status indication can be indicated in any suitable manner such as by the color of the indicator 14 or a particular blinking pattern of the indicator.

If, at 208, the load of the alternative operating system from the removable storage device failed, then logic 12 illuminates indicator 14 to indicate the occurrence of a failure (216). At this point, it is known that at least the alternative operating system experienced a failure while attempting to load. The primary operating system may also have experienced a failure while attempting to load (as determined at 118 in FIG. 2). Upon seeing the indication of a failure via indicator 14, using a button assistance device, a user can activate the user control 22. As a result, the logic 12 causes the indicator 14 to indicate the nature of the error. In this case, the error is that (a) an error was only detected for the attempted load of the alternative operating system or (b) that failures were detected for the attempted load of both operating systems. The logic 12 causes the indicator to differentiate these two errors. For example, a particular color and/or blinking pattern can be implemented for each such error and the color/blinking pattern can be different between the two errors.

If no removable storage device is present at port 16, or a removable storage device is present but does not have an operating system stored thereon, control passes in method 200 from 204 to 220. At 220, the logic 12 determines whether the operating system recovery console 30 is present in system 10. If, the operating system recovery console 30 is not present and/or operational, the logic 12 causes an error status to be indicated by indicator 14 (240). The user can activate the user control 22 to have the logic 12 specifies a particular error code (particular color and/or blinking pattern combination) associated with this error.

If, however, the operating system recovery console 30 is present, then at 220, the logic attempts to load and execute the operating system recovery console 30 (222). The operating system recovery console 30 causes at least enough of an operating system to load to enable the network interface 20 to be active and usable. Once the network interface 20 is enabled, the logic 12 recovers the system's operating system via a network and thus from a source external to the system.

At 224, method 200 comprises determining whether the operating system recovery process of 222 was successful. If the recovery process was successful, then, after determining at 226 that an attempted load of the primary operating system had failed, an error status is indicated on indicator 14 (228). The user can activate the user control 22 using the button assistance device to have the logic 12 visually indicate (by color and/or blinking pattern) the nature of the error (failed primary operating system load, successful recovery using recovery console 30). If the primary operating system was not determined to have failed during an attempted load, the logic causes the indicator 14 to indicate a successful operating system recovery at 230. Again, the user can activate the user control to have the logic indicate, via indicator 14, that the operating system recovery console was successful in loading a new operating and that no error associated with the primary operating system was detected. If, at 224, the logic 12 determines that the operating system recovery console 30 was not successful in recovering the operating system from a source external to the system 12, then at 232 an error status is indicated on indicator 14. The user can have an error code visually provided to the user via the indicator (e.g., by color or blinking pattern).

FIG. 5 provides an illustrative implementation of how the system 10 boots from the network (element 250 in FIG. 2). At 252, the logic 12 starts the process of booting from the network via the network interface 20. Booting from the network comprises, for example, loading a minimal, in some embodiments, operating system and configuring a minimal, in some embodiments, network interface to enable the restore of the NAS device. At 254, the logic 12 determines whether the network boot from 252 completed successfully. If the network boot was successful, then at 256 the logic 12 provides an indication of a successful network boot via indicator 14. If the network boot was not successful, then at 258 the logic 12 provides an error indication via indicator 14. The user can activate the user control 22 to have the logic 12 specify the nature of the error via any of the aforementioned techniques (particular color of the indicator, blinking pattern, etc.).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A network-attached storage (NAS) device, comprising:
   a user control;
   storage in which at least one of an operating system and system firmware is stored; and
   logic coupled to the user control and said storage, said logic determines whether said user control is activated by a user for less or more than a threshold amount of time and selectively causes a recovery to be performed of said operating system based on the user control being activated for less than or more than the threshold amount of time and a recovery to be performed of said system firmware based on the user control being activated for the other of said less than or more than the threshold amount of time;

wherein said NAS device does not comprise any of a keyboard, mouse, trackball, and computer monitor.

2. The NAS device of claim 1 wherein said user control comprises a button incapable of being pressed by a user without a button assistance device.

3. The NAS device of claim 1 wherein the button assistance device comprises a paper clip.

4. The NAS device of claim 1 wherein said NAS device does not comprises a port for connection to a user input device.

5. The NAS device of claim 1 wherein said logic performs recovery of a selected one of the operating system or system firmware based on when said user control is activated by a user relative to a power event of said system.

6. The NAS device of claim 1 wherein said logic performs system firmware recovery upon user activation of said user control while said system is being powered on.

7. The NAS device of claim 1 wherein said logic performs operating system recovery upon user activation of said user control after said system is powered on and before said operating system loads.

8. The NAS device of claim 1 wherein said logic performs operating system recovery upon user activation of said user control after said system is powered on, while an indicator blinks for a period of time, and before said operating system loads.

9. The NAS device of claim 1 wherein said logic illuminates an indicator to indicate error status of the system firmware and the operating system.

10. The NAS device of claim 9 wherein said logic illuminates said indicator based on user activation of said user control.

11. A method, comprising:

detecting whether a user control has been activated for less or more than a threshold amount of time, said user control not comprising a keyboard, mouse or trackball; and performing a recovery of an operating system based on the user control being activated for one of less than or more than the threshold amount of time; and performing a recovery of system firmware based on the user control being activated for the other of less than or more than the threshold amount of time.

12. The method of claim 11 further comprising, via the use of a button assistance device, pressing the user control that otherwise is incapable of being pressed without the button assistance device.

13. The method of claim 11 wherein performing said recovery of the operating system or system firmware occurs based on when said user input was detected relative to a power-on event.

14. The method of claim 11 wherein performing said recovery of the operating system or system firmware comprises recovering the system firmware if said user control is activated while a user activates a power button.

15. The method of claim 11 wherein performing said recovery of the operating system or system firmware comprises recovering the operating system if said user activates said user control after a power-on event and before said operating system loads.

16. The method of claim 11 further comprising indicating an error status of the system firmware or operating system by illuminating an indicator that does not comprise a computer monitor.

17. A system, comprising:

means for detecting whether a user input, that does not comprise a keyboard, mouse or trackball, has been activated for more than or less than a threshold period of time; and means for selectively performing recovery of an operating system based on said user input being activated for one of more than or less than the threshold period of time and for performing recovery of system firmware based on said user input being activated for the other of more than or less than the threshold period of time.

18. The system of claim 17 wherein said means for performing said recovery of the operating system or system firmware is for initiating said recovery of said operating system or system firmware based on when said user input was detected relative to a power on event.

19. The system of claim 17 wherein said means for performing said recovery of the operating system or system firmware is for initiating recovery of said system firmware if said means for detecting a user input detects that a user has activated the user control while the user activated a power button.

20. The system of claim 17 wherein said means for performing said recovery of the operating system or system firmware is for initiating recovery of said operating system if said means for detecting a user input detects that a user has activated the user control after a power-on event and before said operating system loads.

* * * * *